United States Patent [19]

Warnke, III

[11] Patent Number: 5,389,861
[45] Date of Patent: Feb. 14, 1995

[54] MACHINE TOOL POWER SPEED CHANGER

[76] Inventor: Robert L. Warnke, III, 3287 Metamora Rd., Oxford, Mich. 48371

[21] Appl. No.: 96,278

[22] Filed: Jul. 26, 1993

[51] Int. Cl.6 .......................................... H02K 33/16
[52] U.S. Cl. ...................... 318/10; 318/817; 318/291
[58] Field of Search ............ 318/9, 10, 817, 287, 318/291, 293–295, 751; 361/31, 93, 98, 101; 251/129.01, 129.11–129.13

[56] References Cited

U.S. PATENT DOCUMENTS

| | | | |
|---|---|---|---|
| 3,972,506 | 8/1976 | Azuma | 251/133 |
| 4,391,307 | 7/1983 | Levi et al. | 140/140 |
| 4,551,714 | 11/1985 | Giammarese | 340/825.72 |
| 4,677,329 | 6/1987 | Secoura | 310/71 |
| 4,705,061 | 11/1987 | Mueller et al. | 137/269 |

Primary Examiner—William M. Shoop, Jr.
Assistant Examiner—Brian Sircus
Attorney, Agent, or Firm—Warren D. Hill

[57] ABSTRACT

A retrofit power accessory for a turret mill provides a motor drive for changing machine tool speed, replacing a handwheel. A frame is attached to the mill by a pair of adjustable brackets which accommodate various models of mills. The frame carries a spider coupling which attaches to the rotatable machine shaft formerly holding the hand wheel. The spider coupling is driven by a gear motor on the frame through a timing belt and timing gears to positively drive the machine shaft. A manual switch controls the motor in either direction to effect the desired machine tool speed change. A rotary knob is also coupled to the spider coupling to allow manual intervention.

6 Claims, 2 Drawing Sheets

MACHINE TOOL POWER SPEED CHANGER

FIELD OF THE INVENTION

This invention relates to machine tool controls and particularly to a retrofit power control for a tool speed changer.

BACKGROUND OF THE INVENTION

It is standard practice to provide conventional machine tools with manually controlled hand wheels to make adjustments. In some cases the manipulation of the hand wheels consumes substantial time and over a long period of time can be stressful to the machine operator. Turret mills, for example, have such a hand wheel which must be rotated, often for many rotations to select the machine tool speed each time a speed change is needed.

SUMMARY OF THE INVENTION

It is therefore an object of the invention to eliminate manual cranking of hand wheels particularly to changing speed of machine tools. Another object is to provide a retrofit accessory for conversion of existing machine tools such as turret mills to power tool speed changing.

Turret mills, which are sold under the trade name "Bridgeport" as well as other brands, have a variable speed drive comprising variable pitch pulleys which are adjusted by turning a rotatable shaft by a handwheel. By removing the handwheel and substituting a power drive controlled by an electric switch, the speed change is accomplished rapidly and with no operator stress.

A retrofit power drive is attached to the turret mill by a pair of arms or bars which attach to the head of the machine tool and to the power drive. Adjustable connections such as slotted areas for receiving fasteners assist in adapting a given model of accessory to nearly all turret mills. A spider coupling allows attachment of the power output to the speed control shaft when the output and the shaft are approximately aligned, since the spider coupling permits rotary drive in spite of some misalignment.

The power accessory itself has a support frame carrying a motor and a control housing on the outside, and the power output and a belt and pulley drive on the inside. A first power shaft extends through the housing to carry a first pulley and the input side of a drive coupling, and a manually operable knob or wheel on the outside of the frame. A second power shaft extends through the housing to couple the motor to a second pulley. A drive belt links the pulleys for synchronous rotation. The motor operates at a constant speed, when energized, and has a speed reducing gearbox at its output to drive the pulleys at a moderate speed. The motor torque is chosen to be low to avoid damage when the position limits of the speed change mechanism are reached. In the event other torque conditions cause the motor to stall, the manually operated knob is used to momentarily assist the power drive.

The control housing contains an ON/OFF switch which admits power to the accessory. A pilot light is illuminated when the power is on. The same switch effects overload protection to turn off when the current exceeds a prescribed value. An operator controlled switch is normally in a neutral off position but can be moved in either direction and held there to cause motor operation in either direction for machine tool speed increase or decrease. When the switch is released it returns to neutral.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
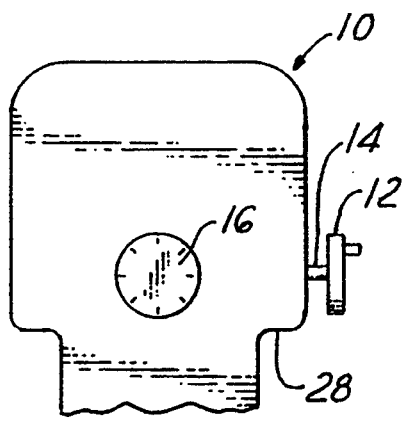
FIG. 1 is a partial view of a turret mill with power speed change apparatus according to the prior art.
Figure 2:
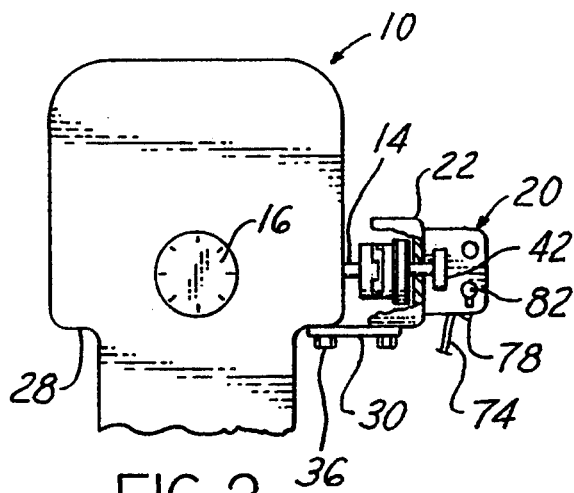
FIG. 2 is a partial view of a turret mill equipped with speed change apparatus according to the invention.

The head 10 or drive portion of a typical prior art turret mill is shown in FIG. 1. A hand wheel 12 attached to a rotatable shaft 14 operates an internal speed change mechanism to select the machine tool speed, and a rotary indicator 16 on the front of the head shows the selected speed. Many turns of the handwheel are required to traverse the whole speed range of the machine. The time waste and operator stress of such wheel rotation is reduced or eliminated by removing the hand wheel 12 and, as shown in FIG. 2, substituting a power speed change apparatus 20.

Figure 4:
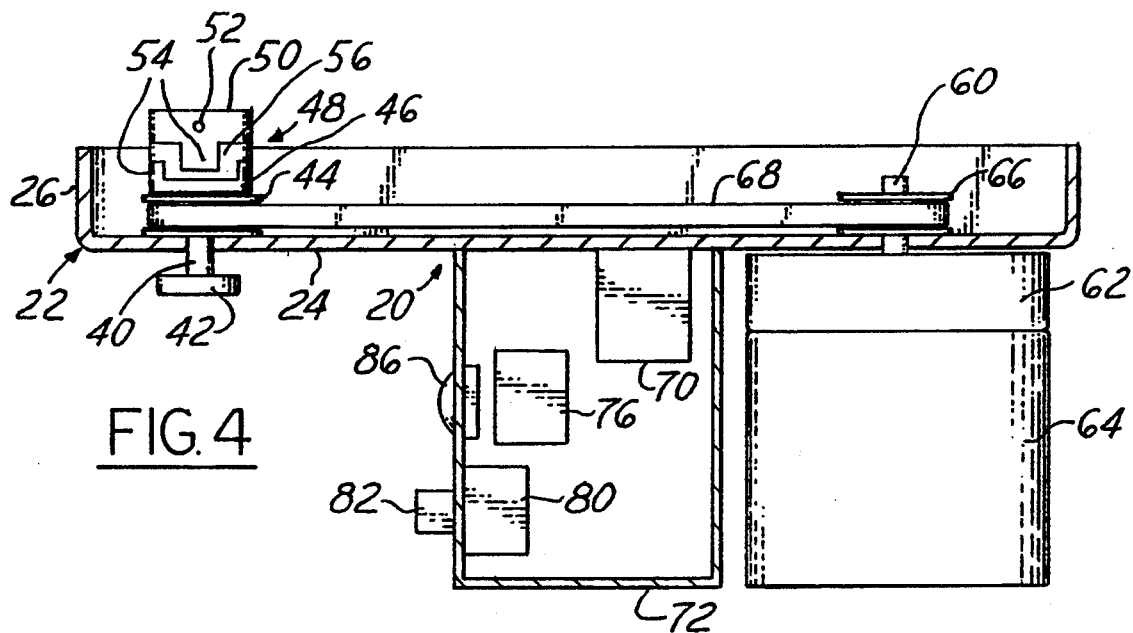
FIG. 4 is a horizontal cross section of the speed change apparatus taken along line 4—4 of FIG. 3.
Figure 3:
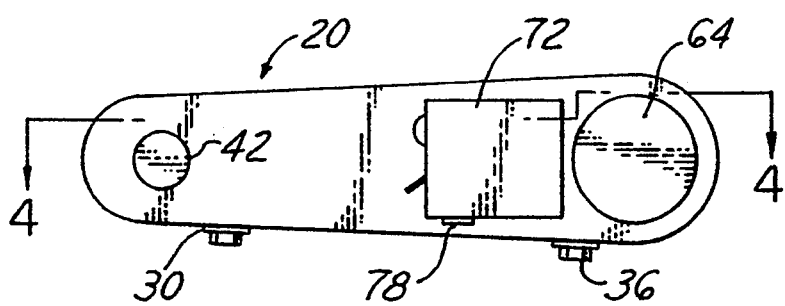
FIG. 3 is an elevational view of the power speed change apparatus of FIG. 2.
Figure 5:
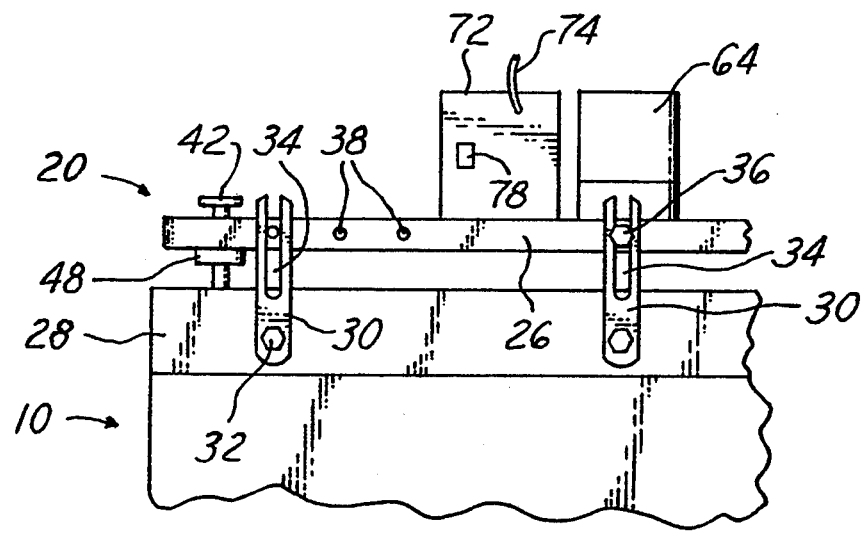
FIG. 5 is a bottom view of the speed change apparatus showing the attachment brackets according to the invention.
Figure 6:
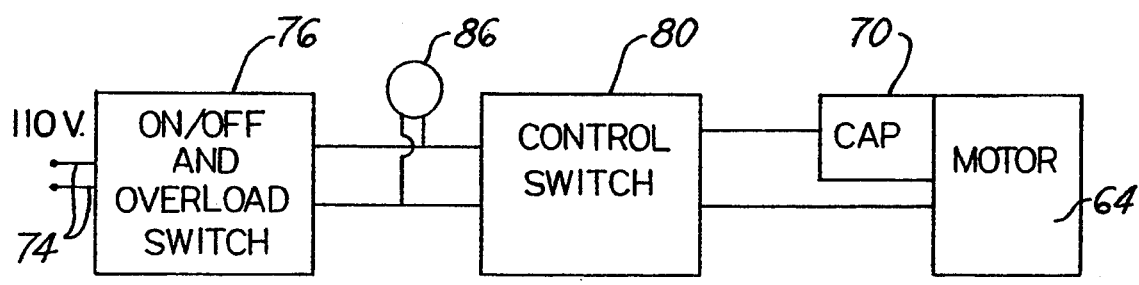
FIG. 6 is a block diagram of the motor control circuit for the power speed change apparatus according to the invention.

As further shown in FIGS. 3, 4 and 5, the power speed change device 20 includes a frame 22 having a plate-like web 24 and a peripheral flange 26 for added frame strength and for protection of moving parts. The flange 26 also assists in mounting the device 20 to the turret mill 10. The turret mills generally have a reduced section below the speed change mechanism which provides a shoulder 28 or horizontal surface for attaching a pair of mounting brackets 30. The brackets 30 each comprise an elongated arm having a mounting hole 32 at one end for bolting to the shoulder 28. The brackets have a longitudinal slot 34 for adjustably receiving bolts 36 for attachment to the bottom flange 26 of the frame. Extra bolt holes 38 in the flange 26 allow a variety of mounting configurations, depending on the shape of the machine being converted.

A first power shaft 40 extends through and is journaled in the frame 22 and has a manually operated knob 42 secured to the outer end. Inside the frame, the shaft 40 has a pulley 44 and a first coupling half 46 of a spider coupling 48. The pulley 44 and the coupling half 46 are secured for rotation with the shaft by a flat (not shown) on the shaft 40. The second coupling half 50 is secured to the rotatable shaft 14 by a set screw 52. Each coupling half has a pair of fingers 54 extending between the fingers of the other half, and are spaced by a rubber spider 56 which is sandwiched between the coupling halves. This type of coupling is well known and permits positive transmission of rotary movement but does not require precise alignment of the two coupling halves. Thus some lateral or angular misalignment of the power shaft 40 and the machine shaft 14 is permitted.

A second power shaft 60 extends through the frame 22 and comprises the output of a gear reduction box 62 which is mounted outside the frame 22. The gear reduction box 62 is packaged as part of a motor 64 so that the shaft 60 is effectively the power output of the motor. A pulley 66 on the shaft 60 inside the frame is secured to rotate with the shaft, and is drivingly coupled to the pulley 44 by a belt 68. Preferably, the belt 68 is a toothed timing belt and the pulleys 44 and 66 are timing gears to effect driving without slippage.

The motor 64 is a permanent split capacitor motor which may be, for example, 1/25 hp, running at a constant speed, and the gearbox 62 output shaft 60 turns at 154 rpm. The capacitor 70 for the motor is housed in a box 72 which also receives 110 v input power on line 74. An ON/OFF switch 76 has a manual toggle control 78 accessible at the bottom of the box 72. The switch 76 also has circuit protection feature which turns off the switch when current exceeds a threshold value. This same feature serves as a torque limiting cutout. A control switch 80 is accessible at the front of the box 72 and has an actuator 82 which is spring-biased to a neutral OFF position. The actuator 82 must be manually moved up and held to energize the motor for rotation in a direction to increase machine tool speed, and moved down and held to decrease machine tool speed. When the actuator is released, it returns to OFF position. A pilot lamp 86 is illuminated whenever the power is on.

As will be apparent, the retrofit power accessory device is readily attached to the turret mill by removing the handwheel from the mill, attaching the coupling half 50 to the rotatable shaft 14, attaching the brackets 30 to the head 10 and to the power device, making adjustments to complete the spider coupling 48.

In operation, the ON/OFF switch 76 is turned on, and the switch 80 is moved in the direction of the desired speed change and held until the target speed is attained, and then released. To slowly close in on the target speed the switch may be operated intermittently. In the event the motor torque is insufficient to drive the speed mechanism, a manual assist may be given by turning the knob 42.

Thus it will be apparent that the retrofit power speed change device is a simple and efficient conversion which is easily applied and provides substantial benefits.

The embodiments of the invention in which an exclusive property or privilege is claimed are defined as follows:

1. A power speed changer for a machine tool wherein the machine tool has a housing and is equipped with a rotatable shaft for setting the machine speed by shaft rotation, the power speed changer comprising:

a coupling for attachment to the rotatable shaft;
   a support frame for attachment to the machine tool housing; and
   power driving means on the support frame comprising:
      a reversible electric motor;
      a gear reduction output driven by the motor;
      a belt and pulley arrangement connecting the gear reduction output and the coupling for rotating the shaft upon motor operation;
      a manually operated switch for energizing the motor for selective rotation in either direction, whereby the shaft is rotated upon switch actuation for increase or decrease of machine speed; and
      an overload switch in circuit with the motor for opening the circuit upon excessive torque demands.

2. The invention as defined in claim 1 wherein the belt and pulley arrangement comprises a timing belt drivingly connecting a timing gear on the gear reduction output and a timing gear on the shaft.

3. The invention as defined in claim 1 wherein the manually operated switch is spring biased to a neutral off position and is manually moved and held in one direction from the neutral position for machine speed increase and in another direction for machine speed decrease.

4. The invention as defined in claim 1 wherein the belt and pulley arrangement includes a second shaft having one end drivingly attached to the coupling and substantially aligned with the rotatable shaft, the second shaft being journaled in the support frame and extending through the frame, and a manually operated knob secured on the other end of the shaft for operator assistance of the power driving means.

5. The invention as defined in claim 1 further including a pair of brackets for attaching the support frame to the machine tool housing, each bracket having means at one location for securing by a fastener to the housing and means spaced from the one location for attachment by a fastener to the support frame.

6. The invention as defined in claim 1 further including a pair of brackets for attaching the support frame to the machine tool housing, each bracket comprising an elongated arm having means at one end for securing by a fastener to the housing and an elongated slot for attachment by a fastener to the support frame at an adjustable location.

* * * * *